UNITED STATES PATENT OFFICE.

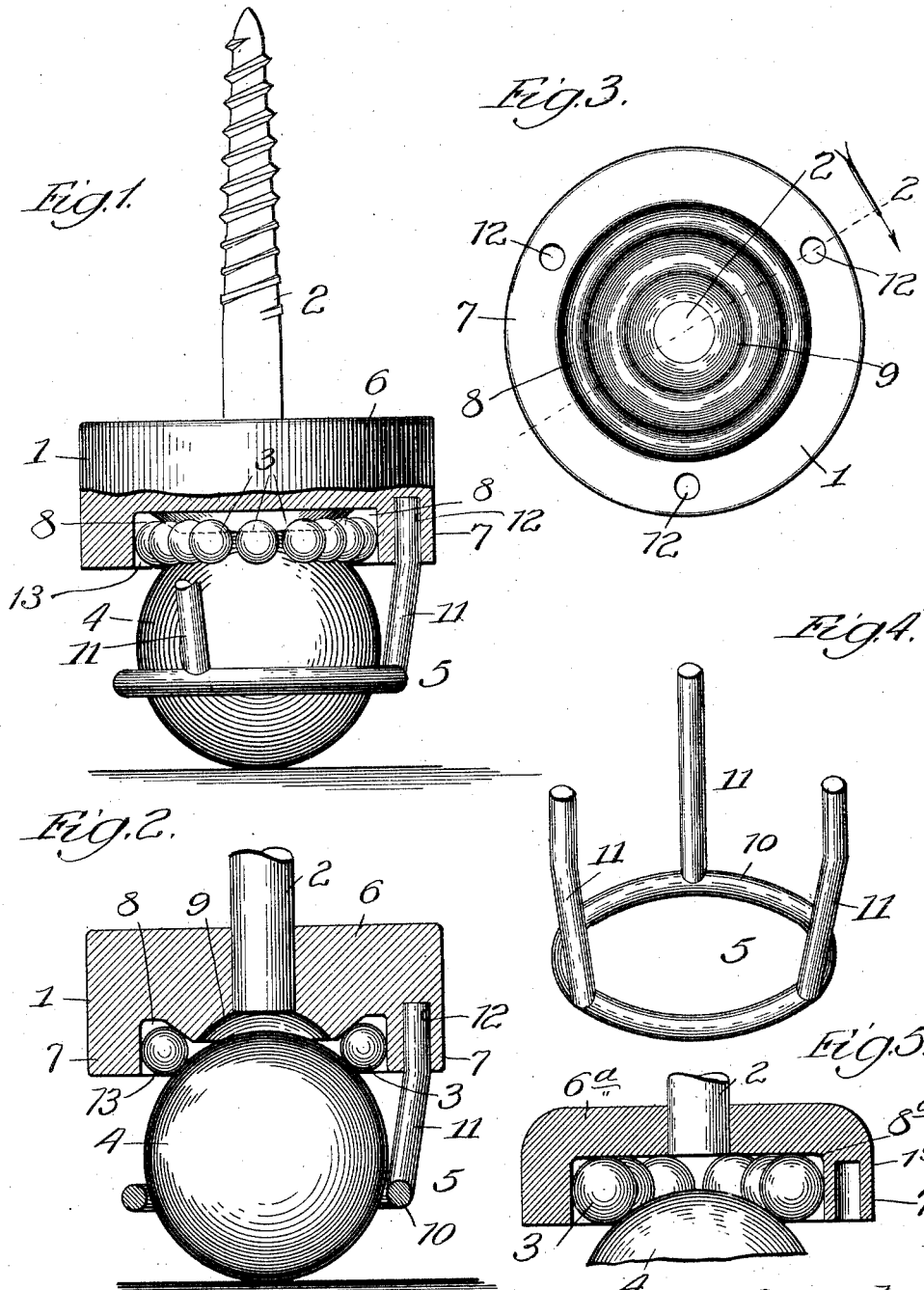

LAURA A. CLIMER, OF CHICAGO, ILLINOIS.

FURNITURE-CASTER.

1,076,954.  Specification of Letters Patent.  Patented Oct. 28, 1913.

Application filed July 20, 1912. Serial No. 710,638.

*To all whom it may concern:*

Be it known that I, LAURA A. CLIMER, a citizen of the United States, residing at Chicago, in the county of Cook and State of Illinois, have invented a new and useful Improvement in Furniture-Casters, of which the following is a specification.

My invention relates particularly to furniture casters of the type employing a large or main ball adapted to travel on the floor and which engages a series of anti-friction balls disposed in a cup or body provided with a race for the anti-friction balls.

Heretofore this type of caster has not come into practical use to any considerable extent owing chiefly to the fact that such casters, as heretofore constructed, collect dust and grit which interfere with the anti-friction qualities, and further because such casters have usually been too expensive.

My primary object is to provide a self-cleansing caster of the type referred to which can be very cheaply manufactured, and which, because of its self-cleansing character, possesses important anti-friction qualities.

The invention is illustrated in its preferred embodiment in the accompanying drawing, in which—

Figure 1 represents a broken elevational view, partly in section, of a caster constructed in accordance with my invention; Fig. 2, a broken sectional view of the same, the section being taken as indicated at line 2 of Fig. 3; Fig. 3, a bottom view of the cup or race-equipped body of the caster; Fig. 4, a perspective view of a retainer or open cage employed; and Fig. 5, a broken sectional view showing a modification.

Referring to Figs. 1 to 4 inclusive, the improved caster comprises a shallow cup, or race-equipped body, 1, equipped with attaching means 2; a series of traveling anti-friction balls 3 contained in said cup; a main, or floor-engaging, ball 4 disposed beneath and engaging the series of balls 3; and a retainer 5 serving to maintain the ball 4 in proper relation with respect to the balls 3.

The body or cup 1, in the form shown in Figs. 1 to 3 inclusive, may comprise a casting or drop-forging consisting of a disk 6 provided with a downturned flange 7 and having a ball-race 8 within said flange. The lower surface of the disk 6 is recessed, as shown at 9, to clear the upper portion of the ball 4. The attaching means 2 is shown in the form of a threaded stem which is rigidly secured to the disk or plate 6 in any desired manner. It will be understood, however, that any suitable attaching means may be employed to connect the disk 6 to the article of furniture. The retainer 5 preferably comprises a ring, or annular member 10, of somewhat smaller diameter than the diameter of the ball 4 and adapted to engage the ball 4 below its center, and arms 11, shown as three in number, depending from the flange 7 and serving to support the ring 10. In the illustration given, the arms 11 converge downwardly, the more effectually to brace the ring 10 and prevent dislocation thereof, in the event that the retainer should strike an obstruction. The upper extremities of the arms 11 are preferably parallel with the axis of the ring 10 and are received in sockets 12 with which the flange 7 is provided. The ring 10 is preferably of circular cross-section, presenting a smooth and rounded surface to the ball 4. The retainer 5 may be cast; or it may be formed of heavy wire, in which case the arms 11 may be brazed or welded to the ring. Any desired method of construction may be employed, however. It will be noted that the ball-cup is shallow, that is, the depending flange 7 is short, so that the ball-race 8 is freely open at its lower side, as indicated at 13, thus providing an annular channel with sufficient clearance to enable any particles of dust or grit which are carried into the cup to freely fall therefrom, so that the caster is self-cleansing. This feature of construction very greatly improves the anti-friction qualities of the caster, as it will be understood that when the caster travels, the ball 4, and also the anti-friction balls 3, are subjected to considerable movement, so that any particles of grit which may be thrown into the cup will be readily dislodged and fall therefrom.

In the modification shown in Fig. 5, the cup $1^2$ is of a form adapting it to be pressed from heavy sheet metal. Otherwise, the construction is similar to the construction already described. In the modified form, the cup is formed by downflanging a circular disk; and in this form the ball-race $8^a$ is formd simply by the inner wall of the depending flange $7^a$ and the lower wall of the disk $6^a$.

In each of the described constructions, the self cleansing feature of the caster is preserved, and cheapness of manufacture assured. It may be added that it is desirable to have the balls 3 very slightly separated from each other, so that they will move freely in the ball-race under all conditions of service. The retainer 5, while shown as formed independently of the flange of the cup, need not be separately formed.

What I regard as new, and desire to secure by Letters Patent, is—

1. A furniture caster, comprising a shallow cup having an annular integral wall portion forming a short depending flange, anti-friction balls in said cup, a main ball below and engaging said series of balls, the said depending flange extending downwardly in a straight vertical line and having its lower edge terminating substantially in line with the bottom of said series of balls, whereby an open space beneath said balls is provided and the accumulation of dirt in the caster is prevented.

2. A furniture caster, comprising a shallow cup having an annular integral unbroken wall-portion forming a short depending flange, a series of balls in said cup, a main ball below and engaging said series of balls, and an annular wire retainer ring encircling said main ball below its center and provided with upwardly diverging arms having their upper ends connected to said flange.

LAURA A. CLIMER.

In presence of—
J. G. ANDERSON,
R. A. SCHAEFER.

---

Copies of this patent may be obtained for five cents each, by addressing the "Commissioner of Patents, Washington, D. C."